United States Patent [19]

Stroke

[11] 3,772,976
[45] Nov. 20, 1973

[54] STORAGE AND RECONSTITUTION OF MICROPHOTOGRAPHIC IMAGES
[76] Inventor: George Wilhelm Stroke, Stony Brook, N.Y.
[22] Filed: June 2, 1972
[21] Appl. No.: 259,084

[30] Foreign Application Priority Data
Mar. 6, 1972 France.............................. 7207723

[52] U.S. Cl..................................... 95/36, 95/18 R
[51] Int. Cl. ........................................... G03b 19/02
[58] Field of Search ...................... 95/18, 36; 352/86

[56] References Cited
UNITED STATES PATENTS
3,462,213  8/1969  Montebello........................... 352/86
3,682,553  8/1972  Kapany................................. 352/86
3,478,661  11/1969  Hecksher.............................. 95/36
3,408,143  10/1968  Mueller................................. 95/36

Primary Examiner—John M. Horan
Attorney—Maxwell James et al.

[57] ABSTRACT

A process for the microscopy of transparent objects, in which the object is placed in a conventional photographic microscope with a diffraction grating system of predetermined spacing disposed in front of the photosensitive layer in which the photographic image is formed. Several images of the object are formed in the one photograph, each corresponding to a given focal plane and a given azimuthal orientation of the grating system with reference to the object. To reconstitute the multiple images recorded in the single photograph, the photograph is illuminated by means of a light source with a small, non-zero numerical aperture and a predetermined spectrum, and an afocal optical system providing at its image focus a real image of the photograph, with appropriate magnification. The beams diffracted by the photograph are selectively masked and the decoded images projected onto a suitable surface, for observation or analysis. The process finds application in three-dimensional microphotography.

3 Claims, 7 Drawing Figures

FIGURE: 2

STORAGE AND RECONSTITUTION OF MICROPHOTOGRAPHIC IMAGES

BACKROUND OF THE INVENTION

Field of the Invention

The invention concerns microscopy and more particularly the miscroscopy of objects which are optically thick, that is whose thickness is large in relation to the depth of focus of the miscroscope objective.

SUMMARY

The aim of the invention is the photographic recording in a single photograph of a series of microscopic images, there being a different focal plan for each image, and the selective reconstitution of said images. The process and apparatus used should not restrict the full use of the facilities of a modern microscope, that is to say it must be possible to use an illumination with a numerical aperture and spectrum chosen at will, as well as all the special optical observation methods, such as black background phase contrast, polarisation and interference, and this without sacrifying the resolution of the images of the series.

The invention consists in a method for the storage in a single photograph of a series of microphotographic images of an optically thick transparent object by: placing said object in a microscope provided with means for photographing said object, placing in front of the photosensitive material for receiving said images a diffraction grating system, and recording each of said images in said material with a respective focal plane and a respective azimuthal orientation of said grating system with respect to said object; and for reconstituting said images by: illuminating said photograph by means of a light source having a small non-zero numerical aperture and a predetermined spectral range and projecting a real optical image of said photograph, with appropriate magnification and selectively masking the beams diffracted from said photograph, onto a surface for observation or analysis.

DESCRIPTION OF THE PREFERRED EMBODIMENTS

Figure 1:
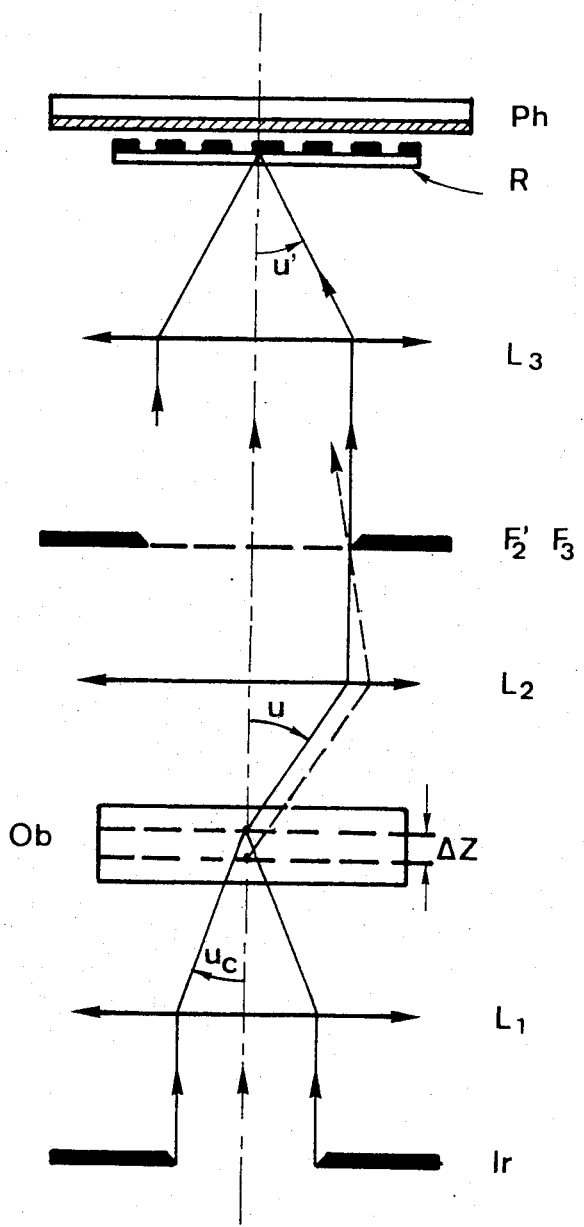
FIG. 1 shows schematically the storage of several microphotographic images on a single photograph, by means of a conventional microscope and using the method of the present invention.

FIG. 1 shows schematically and by way of example a system for studying transparent objects microscopically.

A light source comprises an adjustable iris diaphragm Ir and a condenser $L_1$ illuminated with white light or with light with a spectral composition appropriate to the application.

The transparent object Ob although mechanically thin is generally optically thick, that is its thickness Z is large in relation to the depth of field $\Delta_3$ or the depth of focus of the miscroscope objective.

In this case the conventional microscope can provide $n = Z/\delta z$ distinct images of the object in the field under consideration. It is evident that to conserve the data on the object N microphotographic images of the object must be made, varying the depth of focus by $\delta z$ after each image is captured.

It will be recalled that the depth of field depends on the numerical aperture ON of the objective and of the wavelength $\lambda_n = \lambda/n$ in the optical medium of the objected Ob.

For the limit of vertical resolution $$\delta z = 0.25 \, \lambda / [n - \sqrt{n^2 - ON^2}\,]$$

The object-volume can thus be divided into layers of thickness $\Delta z$ which is a low multiple of $\delta z$, for example $\Delta z = 2 \, \delta z$, whence in this case:

$$\Delta z = 0.5 \, \lambda / [n - \sqrt{n^2 - ON^2}\,]$$

Following the optical path from the iris diaphragm Ir of condenser $L_1$ to the photographic plate Ph it is seen that the schematic diagram of FIG. 1 is that of a conventional microscope except in that a plant rectilinear diffraction grating R is disposed in front of the photosensitive layer Ph, which may be of any type suitable to the application: black and white or color, positive or negative. The opaque strips of the grating system mask the plate Ph according to the area they occupy.

The grating R constitutes the principal element of the coding arrangement of the invention and is characterized by its spacing $p$ and its azimuthal orientation $\theta$ in relation to the miscrosopic object Ob under study.

This first part of the arrangement further comprises means for changing the parameters $p$ and $\theta$ of the grating R, rapidly and without vibration. These means can be coupled to automatic control means of the focussing system and/or with the shutter. Furthermore, the simple grating R with fixed spacing $p$ can be replaced by a system of two superposed gratings (FIG. 5) or by an auxiliary optical system equivalent to a series of gratings (FIG. 6) as will be further described below.

The general principles of the process of the invention will now be described.

So as to avoid limiting the lateral resolution of the miscroscope, the spacing $p$ of the grating R must be smaller than the limit of resolution in the plant of the photograph Ph. The limit of object resolution in space is:

$$\delta x = \lambda/2 \, ON$$

and the limit of image resolution is $$\delta x' = M \cdot \delta x$$

where M is the photographic magnification of the microscope. The maximal spacing p of the grating R is thus given by expression:

$$p \leq M \cdot \lambda/2 \cdot ON$$

which is sufficient to retain all data in the image in spite of the presence of the grating R.

For reasons concerned with the restitution of the image and which will be explained below, a distinctly smaller maximal value of the spacing p must be used, of the order of:

$$p = \tfrac{1}{3} M \cdot \lambda/2 \cdot ON.$$

It is apparent that all the gratings used must have minimum spacings distinctly greater than the limit of resolution of the photosensitive layer employed, which can always be achieved by choosing a sufficiently high magnification M.

It follows that the first part of the arrangement, for storing or encoding the images, must include a projective optical system giving to the image a magnification M best adapted to carrying out the method of the invention.

By way of example, there will now be described the recording of a series of two images by means of a photographic microscope provided with a simple grating R rotatable in its own plane, in front of and in contact with the photosensitive layer Ph.

The first image with the object at the position $z_1$ in relation to the objective focus is photographed through the grating R with an arbitrary orientation $\theta_1$. The object having been brought to the position $z_2 = z_1 - \Delta z$, the second image is then taken with a new azimuthal orientation, for example $\theta_2 = \theta_1 - 90°$.

Thus after development of the photograph Ph with the cumulative data on the two focal planes $z_1$ and $z_2$ of the object, the photograph seems to the naked eye to consist of two superimposed images, the image of the grating being too fine to be visible. But, owing to the variable orientation grating R, each of the two images can be separately reconstituted, by the use of the remainder of the arrangement, for decoding or reconstituting the images.

Figure 2:
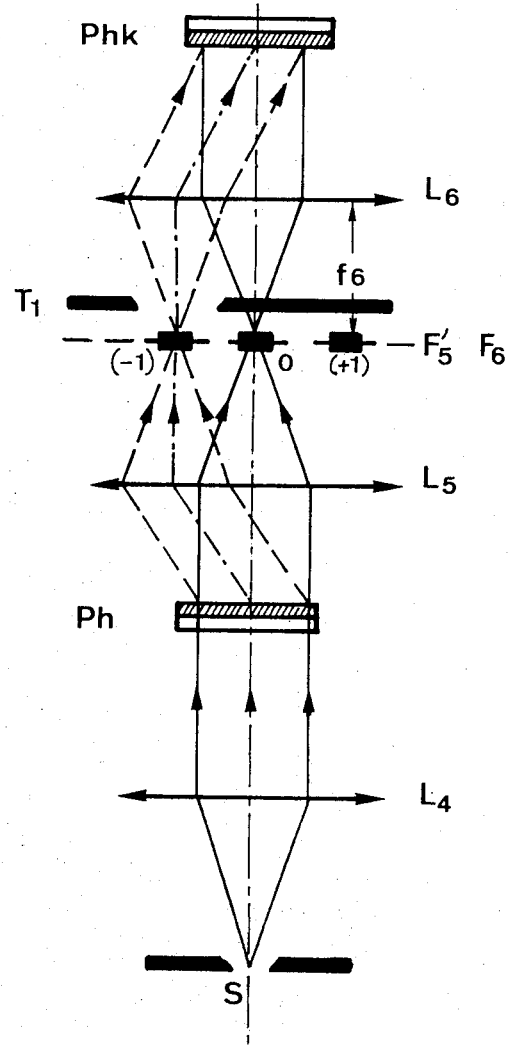
FIG. 2 shows schematically the manner of decoding or reconstituting the multiple images so stored.

FIG. 2 shows schematically such a decoder.

The photograph Ph prepared as described with reference to FIG. 1, in black and white or color, positive or negative, is illuminated by means of a small non-point source S of white light and a converging lens $L_4$. An afocal system of lenses $L_5$ and $L_6$ produces a real image at the image focus $F'_6$ of lens $F_6$.

Figure 3:
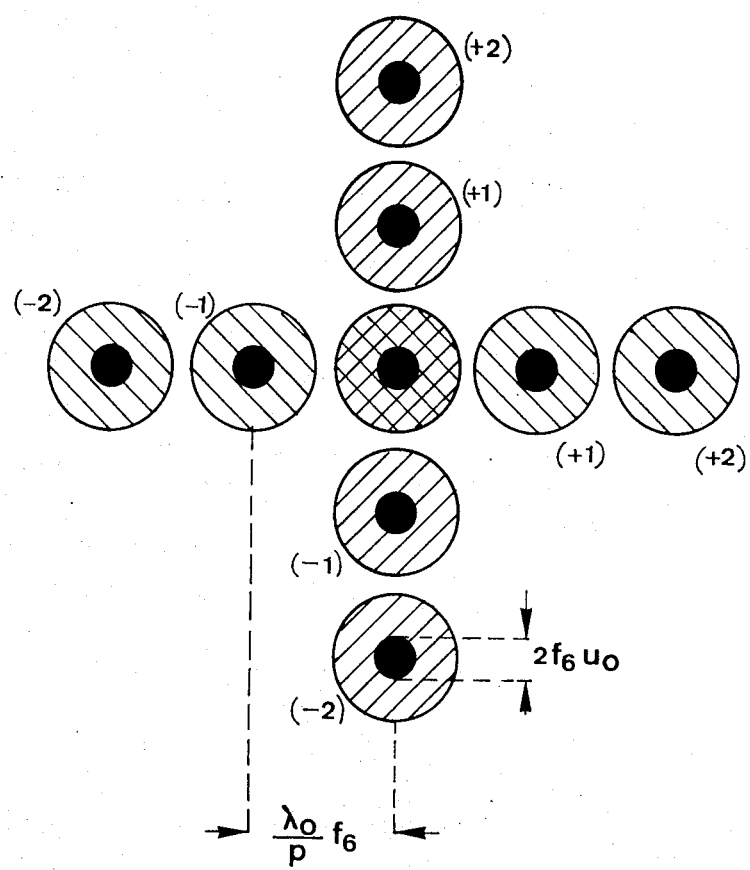
FIG. 3 shows two series of luminous patches arranged in cruciform manner and corresponding to the storage in one photograph of two/images.

In intercepting the light in the plane $F'_5 F_6$ between lenses $L_5$ and $L_6$, a cruciform arrangement of luminous spots is observed, as shown scmematically in FIG. 3.

The horizontally arranged spots correspond to the position $z_1$ and the vertically arranged spots to the position $z_2$.

The central spot corresponds to the two focussings at one and the same time.

In the simplest case the arrangement of the spots corresponds to a "square" grating R, resulting in the appearance of the spots $\pm 2 \ldots$ which do not exist when the coder grating R has sinusoidal photometric profile, although such a profile is more difficult to make.

In order to select a single one of the two images it is sufficient to mask all spots save one in one of the two arms of the cross, the central spot being always masked. If on the other hand all the diffracted beams except the central one are unmasked, to obtain an increase in luminosity, a single image is still obtained by following one arm of the cross, but if the image is observed under magnification it is seen to be modulated by a grating as in a television picture.

This modulation can be suppressed when the illumination is by white light. On the path of each beam which is to contribute to the image is placed a sheet of glass, the sheets being plane and parallel and each differing in thickness by at least 0.05 mm from all the others.

The arrangement of FIG. 2 therefore essentially comprises illumination means for the coded photograph Ph with a small non-zero numerical aperture and a desired spectral composition, an optical system ($L_4$, $L_5$, $L_6$) for reproducing the photograph with an appropriate magnification M, means $T_1$ for selectively masking the beams diffracted by the coded photograph Ph, and a surface Phk onto which the reconstituted images are projected. FIG. 2 shows how the decoder proper ($T_1$) is placed in a plant between the lenses $L_5$, $L_6$ serving as an image reproduction objective.

This decoder is an opaque mask with one or more apertures. In the latter case, the apertures are preferably covered with glass sheets of varying thickness.

This mask is placed in the plane of the image of the source provided by the system $L_4$, Ph, $L_5$. This plane is also that of the pupil of the reproduction system $L_5$, $L_6$. This pupil should be used to best advantage in dependence on the characteristics of the microscope and photosensitive layer, and the number of images to be coded in one photograph.

If the light forming the image (FIG. 1) is contained in a solid angle of diameter $2u'$, it is possible to evaluate the diffraction angle of the developed photograph when illuminated with parallel light.

If, for example, the developed photograph is a positive for which the transformation ratio is equal to $-1$, that is out which is faithful to the object, it can be said that its diffraction angle will be at least doubled when placed in the decoder. If, moreover, the illumination has a numerical aperture $\mu_o$ the apparent diameter of the diffraction pattern containing all the image data will be:

$$u \approx 2(2u' + \mu_o).$$

The modulation of the photograph by the grating R with spacing p multiplies this diffraction pattern in creating a series of diffraction patterns angularly spaced by an angle $$\alpha = \lambda/p$$

In the plane of the pupil $F_5'$, $F_6$ the linear diameter of each pattern will be $2f_5 U$ and it is essential that these figures do not interfere, so the maximal spacing must be such that $\alpha \geq 2f_5 U$ or $\lambda/p\, M \geq 2f_5 U$. But when the restitution is carried out with white or colored light this relationship depends on the wave-length $\lambda$ and the shortest wavelength $\lambda_m$ transmitted by the coded photograph must satisfy the inequality:

$$\lambda m/pM \geq 2f_5 U.$$

To code a given number of images the spacing $p$ and orientation $\theta$ of the coder grating R can both be varied.

Figure 4:
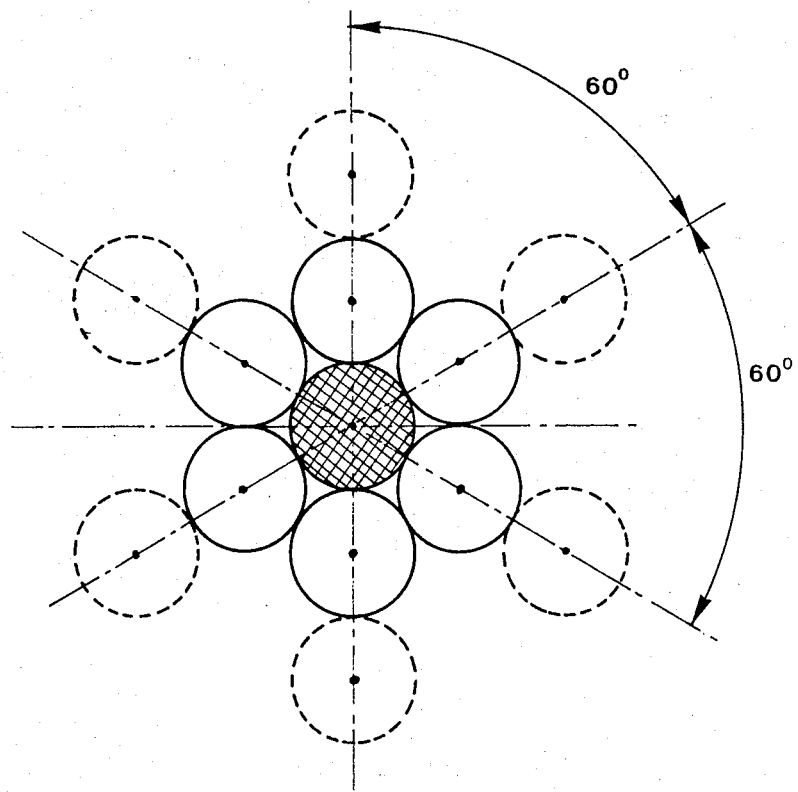
FIG. 4 shows the coding of three images by means of a single diffraction grating.

It will be appreciated, for example, that three images can be coded with a single grating with a spacing $p \leq \lambda m/2f_5 U$ (FIG. 4). The spacing $p$ must be made increasingly small as the contrast slope $\gamma$ of the coded photograph increases.

It is thus preferable to make low contrast images and to retrieve contrast on reconstitution.

To record more than three images it is advantageous to use so-called sinusoidal gratings whose diffraction spectrum consists of only three beams. In this case the pupil $F'_5 F_6$ will be used to best advantage and when several images are recorded the minimal spacing $p$ will be greatest.

It will be appreciated that so-called square gratings may be used but in this case the useful aperture of the reconstitution pupil will be greater for the same number of images.

It should also be noted that the use of white or non-monochromatic light with a total spectral width $\Delta\lambda$ extends the diffraction patterns in the radial direction while the use of a source with an aperture still further increases the radii of these patterns.

So far it has been assumed that the coder gratings R are disposed close to or in contact with the photosensitive layer Ph. However, to encode more than three images several gratings of varying spacing are needed.

It is thus necessary either to provide a series of gratings which are rapidly interchangeable, pivoting in their own plant before the photograph, or to replace this multiplicity of gratings by an optically equivalent device.

By way of example, two systems for replacing the simple grating R of FIG. 1 will now be described.

Figure 5A:
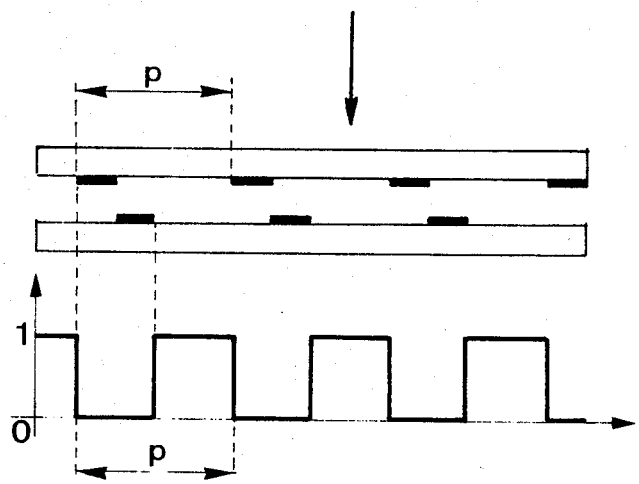
FIGS. 5a and 5b show two embodiments of the diffraction grating system of the coding arrangement of FIG. 1.
Figure 5B:
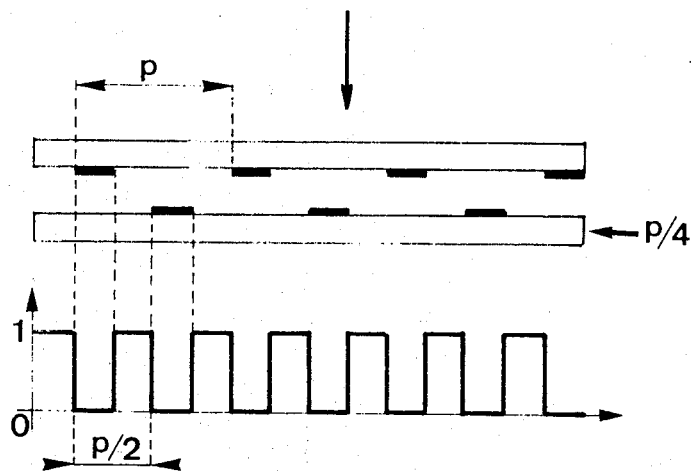
Figure 6:
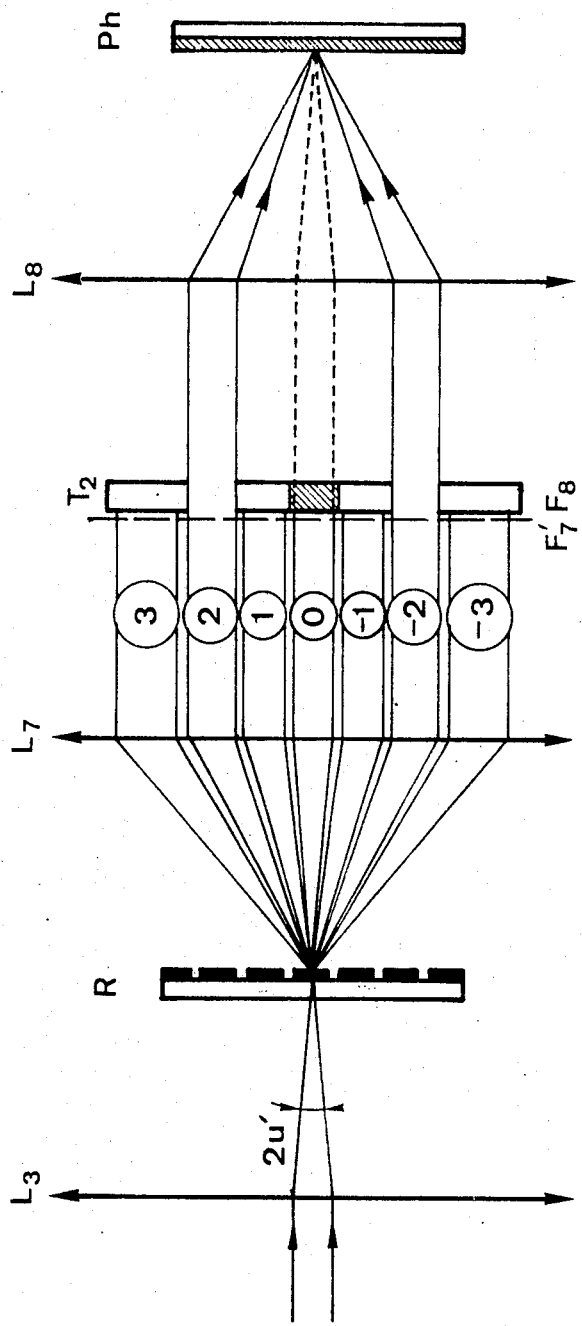
FIG. 6 shows an arrangement for simulating a sinusoidal diffraction grating for the coding arrangement of FIG. 1.

The first consists of two identical gratings, in contact with one another and relatively displaceable to a limited extent. The gratings, shown in FIGS. 5a and 5b, are of the rectangular type with a cyclic or mark: space ratio of 1:2 and spacing $p$. By moving one with respect to the other by $p/4$ the resultant grating system has a spacing of $p$ or $p/2$.

The second system is an auxiliary optical device disposed between the grating R and the coded photograph Ph. It is shown schematically in FIG. 6.

The grating R is projected onto the photograph Ph by means of an afocal system comprising lenses $L_1$ and $L_8$.

In the plane $F'_7 F_8$ appear the different diffraction orders of the grating R surrounded by the diffraction patterns due to the light diffracted by the object and limited by the outlet pupil of the objective. There are thus observed in the plane $F'_7 F_8$ circular spots with a diameter $2u'f_7$ in the case of monochromatic light. The photograph Ph is thus modulated by the grating R as if the grating were in contact with it.

It is however, possible to modify the real image of the grating R on the photograph Ph by placing in the plane $F'_7 F_8$ an opaque mask T2 allowing the passage of a pair of spots of the same rank, such as ($+1$) and ($-1$) or ($+2$) and ($-2$) for example, or such a pair with in addition the spot of rank O, adjusting its intensity to the sum of the diffracted intensities. A series of gratings with varying spacings can thus be simulated by means of a single rectangular grating, preferably having wider opaque strips than transparent strips. The variable spacing is:

$P_k = p_0/k$ where $P_o$ is the grating spacing and $k$ the diffraction order.

These optically simulated gratings have a sinusoidal profile which is advantageous for encoding a large number of images. It will be realized that the grating R and mask T2 must be rotatable about the optical axis to vary the azimuth orientation $\theta$.

When a colored image is recorded on a color-sensitive layer, the spectral compositions of the light transmitted by the object and that transmitted by the photograph are not related in a simple manner and the fidelity of color reproduction poses problems which also depend on the photographic material employed.

Nevertheless a colored microscopic object may be coded and decoded by using the invention and with commercially available color photography materials. The decoded images may not always be entirely faithful as regards color, but in microscopy this is generally a secondary consideration.

I claim:

1. A system for the storage in a single photograph of a series of microphotographic images of an optically thick object, said system comprising:

a microscope for receiving said object; means for photographing said object;

a diffracting grating system with variable azimuthal orientation disposed between the position of said object and the position at which said photograph is made, said grating system comprising i) a single rectangular grating and ii) an auxiliary optical device including an afocal optical system incorporating an apertured mask and having an optical axis about which said grating and said mask are simultaneously rotatable, and:

means for varying the focal plane of said microscope and said azimuthal orientation of said grating system.

2. A system for the reconstitution of series of microphotographic images obtained from the system according to claim 1 comprising, a light source and optical system for illuminating said photograph, and means for selectively masking the beams diffracted by said photograph, said means being disposed in the real image plane of said source and comprising a mask provided with a plurality of apertures and all but one of said apertures being covered with a glass plate, said glass plates all having different thickness.

3. A system for the reconstitution of series of microphotographic images obtained from the system according to claim 1 comprising a light source and an optical system for illuminating said photograph, and means for selectively masking the beams diffracted by said photograph, said means comprising, i) a single rectangular grating and, ii) an auxiliary optical device including an afocal optical system incorporating an apertured mask and having an optical axis about which said grating and said mask are simultaneously rotatable.

* * * * *